US012760596B2

(12) United States Patent
Porretta

(10) Patent No.: US 12,760,596 B2
(45) Date of Patent: Oct. 13, 2026

(54) MODULAR GATE ASSEMBLY AND METHOD OF CONSTRUCTING A GATE ASSEMBLY

(71) Applicant: Greenwood Fence LLC, Addison, IL (US)

(72) Inventor: Salvi Porretta, Wood Dale, IL (US)

(73) Assignee: Greenwood Fence LLP, Addison, IL (US)

(*) Notice: Subject to any disclaimer, the term of this patent is extended or adjusted under 35 U.S.C. 154(b) by 0 days.

(21) Appl. No.: 19/013,182

(22) Filed: Jan. 8, 2025

(65) Prior Publication Data

US 2025/0223870 A1 Jul. 10, 2025

Related U.S. Application Data

(60) Provisional application No. 63/619,396, filed on Jan. 10, 2024.

(51) Int. Cl.

| | |
|---|---|
| ***E06B 11/02*** | (2006.01) |
| ***E04H 17/14*** | (2006.01) |
| ***E06B 11/04*** | (2006.01) |
| *E04H 17/00* | (2006.01) |
| *E04H 17/22* | (2006.01) |
| *E06B 3/70* | (2006.01) |

(52) U.S. Cl.

CPC .......... *E06B 11/02* (2013.01); *E04H 17/1456* (2021.01); *E06B 11/04* (2013.01); *E04H 17/006* (2021.01); *E04H 17/22* (2013.01); *E06B 2003/7011* (2013.01)

(58) Field of Classification Search

None

See application file for complete search history.

(56) References Cited

U.S. PATENT DOCUMENTS

| | | | | |
|---|---|---|---|---|
| 4,344,253 | A * | 8/1982 | Stiles | E06B 7/367 16/250 |
| 5,702,090 | A * | 12/1997 | Edgman | E04H 17/1426 256/65.02 |
| 5,765,311 | A * | 6/1998 | Kapler | E06B 7/367 160/40 |
| 9,260,861 | B2 * | 2/2016 | Babikian | E04H 1/1244 |
| 11,053,707 | B2 | 7/2021 | Lebrija | |
| 11,261,662 | B2 | 3/2022 | Wright et al. | |
| 11,286,687 | B2 | 3/2022 | Springborn | |
| 11,629,553 | B2 | 4/2023 | Morton, III et al. | |
| 11,686,154 | B2 | 6/2023 | Wright et al. | |
| 11,891,832 | B2 * | 2/2024 | Schneider | E04H 17/21 |

(Continued)

FOREIGN PATENT DOCUMENTS

| | | | |
|---|---|---|---|
| DE | 202014105305 | 8/2016 | |
| DE | 102020100493 A1 * | 7/2021 | E06B 11/02 |

(Continued)

*Primary Examiner* — Catherine A Kelly

(74) *Attorney, Agent, or Firm* — Stephen T. Scherrer; Monique A. Morneault; Scherrer Patent & Trademark Law, P.C.

(57) ABSTRACT

The present disclosure relates to an improved modular gate assembly and a method of constructing a modular gate assembly. Specifically, the present disclosure relates to an improved modular gate assembly which is easy to assemble and provides exceptional structural integrity to prevent sagging commonly found in standard gates.

15 Claims, 18 Drawing Sheets

(56) References Cited

U.S. PATENT DOCUMENTS

| | | | | |
|---|---|---|---|---|
| 12,110,703 | B2 * | 10/2024 | Lebrija | E04H 17/1413 |
| 2006/0186391 | A1 * | 8/2006 | Hansen | E06B 3/5454 256/24 |
| 2008/0229696 | A1 | 9/2008 | Benson et al. | |
| 2017/0058557 | A1 * | 3/2017 | Wu | E04H 17/22 |
| 2023/0212875 | A1 * | 7/2023 | Walker | E04H 17/168 256/24 |

FOREIGN PATENT DOCUMENTS

| | | | | |
|---|---|---|---|---|
| EP | 2273040 | A1 * | 1/2011 | E04H 17/165 |
| EP | 2354432 | | 8/2011 | |
| EP | 3483381 | A1 * | 5/2019 | E06B 11/02 |
| EP | 3744943 | A1 * | 12/2020 | E06B 11/02 |
| EP | 3771799 | | 2/2021 | |
| EP | 3845729 | A1 * | 7/2021 | G07C 9/20 |
| FR | 2799489 | A1 * | 4/2001 | E04H 17/165 |
| FR | 2887911 | A1 * | 1/2007 | E06B 11/02 |
| GB | 2547710 | | 8/2017 | |
| WO | 2004033839 | | 4/2004 | |
| WO | 2005078228 | | 8/2005 | |

* cited by examiner 122
121a
120
123

112

121a
124
123
120
121
122

120
123

MODULAR GATE ASSEMBLY AND METHOD OF CONSTRUCTING A GATE ASSEMBLY

TECHNICAL FIELD

The present disclosure relates to an improved modular gate assembly and a method of constructing a modular gate assembly. Specifically, the present disclosure relates to an improved modular gate assembly which is easy to assemble, providing improved construction and aesthetics as well as exceptional structural integrity to prevent sagging commonly found in standard gates.

BACKGROUND

Fences and gates are commonly used outside of homes, gardens, yards, pools, outdoor decks, etc. Fence and gate assembly kits are commonly provided for the consumer to assemble and install the fence and gate assembly on property. However, the complexity of fence and gate assembly, the requirement for specialized tools and the time commitment for assembly often discourages consumers from installing fences and gates him/herself, therefore relying on costly professional installation. Additionally, the location and weather conditions of installation of fences and gates can bring another set of uses, such as gate sagging, post shifting and other aesthetic issues.

Gate fabrication involves a process that demands exacting precision and labor-intensive efforts, with extremely narrow margins for error. This traditional approach often required the incorporation of additional parts into the gate assembly, such as gusset plates or interior brackets. While these components were integral to the gate's structure, they added to the overall weight, predisposing the gates to common issues like sagging. Furthermore, these additional parts disrupted the desired aesthetic of a seamless and elegant gate, creating a visual inconsistency in the final product.

Therefore, a need exists for an improved modular gate assembly engineered to be effortlessly assembled, utilizing modular components that harmonize to form a gate that is not only highly functional but also maintains structural integrity without the tendency to sag.

A need further exists for an improved modular gate assembly which has a seamless appearance with no exposed hardware in stark contrast to the visibly segmented and mechanically cluttered look of traditional gates.

Moreover, a need also exists for an improved modular gate assembly having adjustable hinges allow for ample play to accommodate gate post shifting, especially in freezing climates.

SUMMARY

The present disclosure relates to an improved modular gate assembly and a method of constructing a modular gate assembly. Specifically, the present disclosure relates to an improved modular gate assembly, which is easy to assemble and provides exceptional structural integrity to prevent sagging commonly found in standard gates. The present disclosure further provides a method of constructing the improved modular gate assembly, resulting in an improved gate assembly with improved construction and aesthetics over prior gate products.

To this end, in an embodiment of the present disclosure, an improved modular gate assembly is provided. The modular gate assembly comprises a first upright having four walls surrounding an open interior, an opposing second upright having four walls surrounding an open interior, a longitudinal channel extending from an outer wall of each of the first upright and second upright, wherein the channel is configured for receiving a panel insert and a plurality of panels within each upright. A series of panels are interlocked and stacked in a horizontal position within the uprights to create a solid structure of the gate assembly.

In another embodiment of the present disclosure, a method of constructing a modular gate assembly is provided. The method comprises the steps of setting a first support post into position, setting a second support post into position opposite to the first support post, providing a first upright having a channel for receiving a series of panels, inserting a panel insert into the channel of the first upright, securing a base into the panel insert in a perpendicular position to the first upright to form a right angle, sequentially adding a series of panels onto the base in a horizontal configuration and into the panel insert to create a gate panel, and inserting the gate panel into a second upright opposing the first upright.

It is, therefore, an advantage and objective of the present disclosure to provide an improved modular gate assembly and a method of constructing a modular gate assembly. Specifically, the present disclosure relates to an improved modular gate assembly with improved construction and aesthetics, which is easy to assemble and provides exceptional structural integrity to prevent sagging commonly found in standard gates.

It is a further advantage and objective of the present disclosure to provide an improved modular gate assembly which has a seamless appearance with no exposed hardware without compromising functionality.

Additional features and advantages of the present disclosure are described in, and will be apparent from, the detailed description of the embodiments.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present disclosure relates to an improved modular gate assembly and a method of constructing a modular gate assembly. Specifically, the present disclosure relates to an improved modular gate assembly which is easy to assemble and provides exceptional structural integrity to prevent sagging commonly found in standard gates, with improved construction and aesthetics.

The present modular gate assembly and method of constructing a modular gate assembly represents a significant advancement in gate design, combining ease of assembly, structural robustness, and a sleek, modern aesthetic that stands as a hallmark of innovation in the realm of gate construction. The design feature of adding individual panels in series creates a full gate panel without any gaps providing a solid structure privacy gate.

Figure 1:
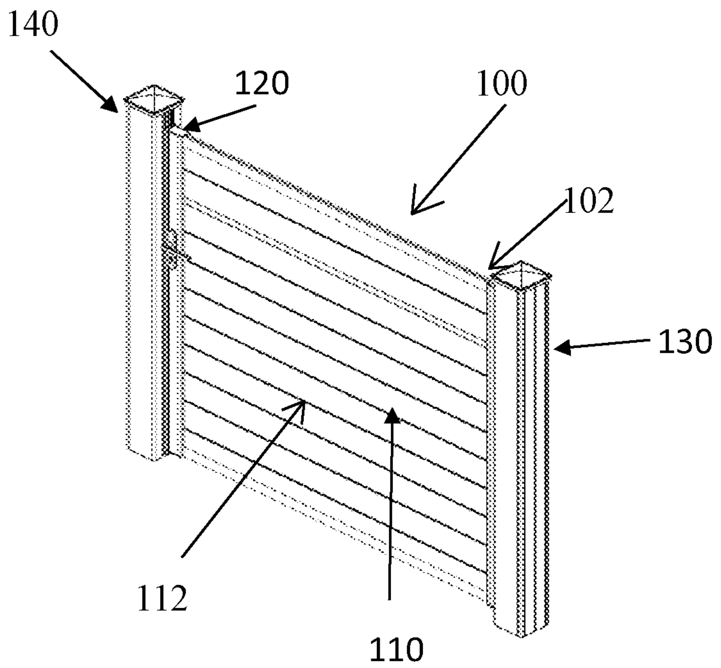
FIG. 1 illustrates a modular gate assembly having a single gate panel design according to the present disclosure.
Figure 2A:
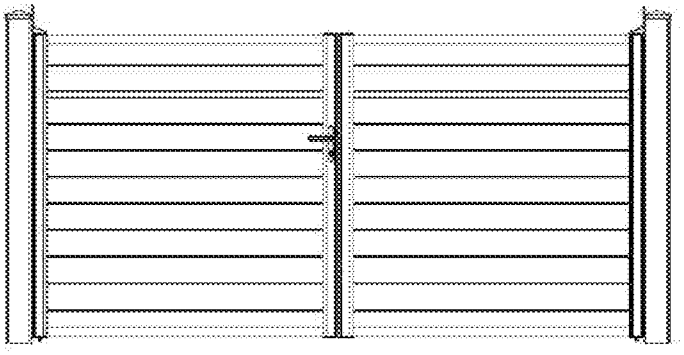
FIG. 2A illustrates a modular gate assembly having a double gate panel design according to the present disclosure.
Figure 2B:
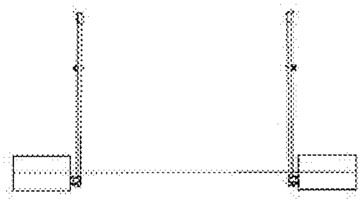
FIG. 2B illustrates the modular gate assembly of FIG. 2A in a first open position.
Figure 2C:
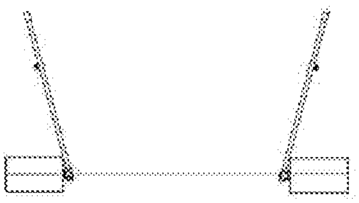
FIG. 2C illustrates the modular gate assembly of FIG. 2A in a second open position.

By combining a series of components, the present modular gate assembly can be constructed as either a single modular gate assembly 100 (FIG. 1) or a double modular gate assembly 200 (FIG. 2). The construction of both embodiments of the single gate assembly and double gate assembly will essentially be the same, which include constructing a gate panel for positioning between a hinge side post and an opposing handle/lock post. A first gate panel and the second gate panel for the double gate assembly are constructed in the same manner as the single gate assembly; however, the second gate panel of the double gate assembly does not include a handle/lock assembly on the second gate panel. Therefore, for simplicity, the components, construction and installation of the gate panels for the single gate assembly 100 will be described, with the understanding that the description relates to construction of the gate panels for the double gate assembly 200 as well.

Referring to FIG. 1, the modular gate assembly 100 generally includes a gate panel 112 formed between a first upright 102 and an opposing second upright 120. The first upright 102 forms the hinge side of the modular gate assembly, incorporating bottom and top hinges 132, 134 attached to the bottom and top of the first upright, respectively. The hinges 132, 134 permit the gate panel to move between a closed position and an open position. The second upright 120 incorporates a handle and lock assembly 150, which closes and secures the gate panel 112 of the modular gate assembly 100, 200. As will be described, a plurality of individual panels 110 is positioned between the first upright 102 and the second upright 120 creating the gate panel 112 for either a single gate assembly 100 or a double gate assembly 200. The components of the modular gate assemblies 100, 200 are constructed from aluminum alloy which is known for strength, durability, corrosion resistance to ensure longevity and structural integrity.

Figures 3A, 3B, 3C:
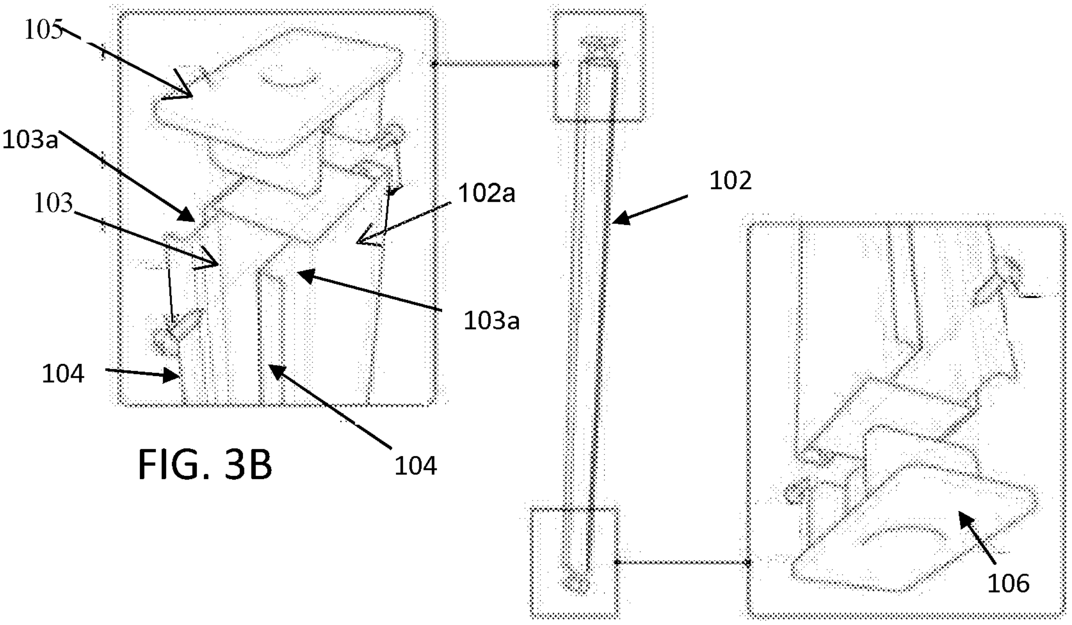
FIG. 3A illustrates a first upright of the modular gate assembly according to the present disclosure.
FIG. 3B illustrates a close-up view of a top of the first upright of FIG. 3A.
FIG. 3C illustrates a close-up view of a bottom of the first upright of FIG. 3A.

Referring now to FIG. 3A, there is shown the first upright 102 of the modular gate assembly 100. The first upright 102 forms the hinge side of the modular gate assembly 100. The first upright 102 has a longitudinal shape formed by four vertical side walls 102_a_ surrounding a hollow interior. Along one of the vertical side walls 102_a_, a channel 103 is formed by two opposing sides 103_a_ extending outward from and perpendicular to the vertical side wall. Each opposing side 103*a* ends in a flange 104 fanning outward perpendicular from each side 103*a* of the channel (FIG. 3B). The U-shaped longitudinal channel 103 extends along a length of the side wall 120*a* of the first upright 102. As will be described, the longitudinal channel 103 and its opposing flanges 104 are configured for receiving and engaging a panel insert 108 and a plurality of individual panels 110 for creating the gate panel 112 of the modular gate assembly 100 of the present disclosure.

FIG. 3B further illustrates a top end cap 105 installed to cover the top of the first upright 102. FIG. 3C further illustrates a bottom end cap 106 installed to cover the bottom of the first upright. The top end cap 105 and bottom end cap 106 prevent water from entering the hollow interior of the first upright 102, and also provide an aesthetically pleasing appearance to the first upright.

Figure 4A:
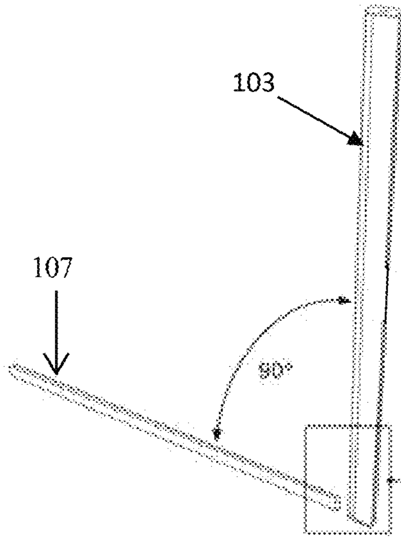
FIG. 4A illustrates mounting a base to the first upright of the modular gate assembly according to the present disclosure.
Figure 4B:
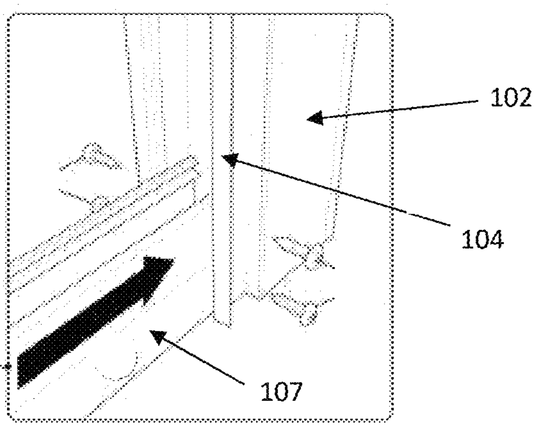
FIG. 4B illustrates a close-up of mounting the base to the first upright of FIG. 4A.

The first upright 102 is an initial structure for construction of the gate panel 112 and ultimately the modular gate assembly 100, 200 of the present disclosure. Referring now to FIGS. 4A-4B, construction of the gate panel 112 is initiated with a base 107 inserted into a bottom of the channel 103 of the first upright 102. As shown by the direction of the arrow in FIG. 4B, the base 107 is slide into the channel 103 such that the base is positioned at a 90° angle to the first vertical upright 102 and secured using known fasteners. The base 107 thereby forms a bottom edge of the modular gate assembly 100.

Figure 5C:
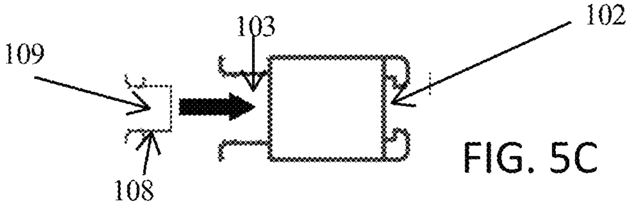
FIG. 5C illustrates a top view of the panel insert for the first upright of FIG. 5A.
Figure 5A:
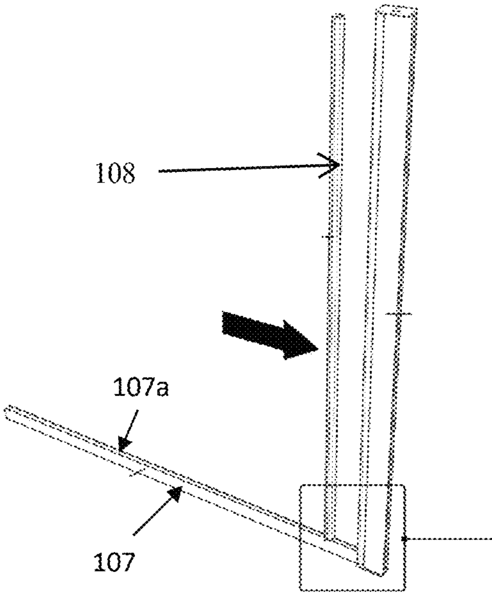
FIG. 5A illustrates a panel insert for the first upright of the modular gate assembly of according to the present disclosure.
Figure 5B:
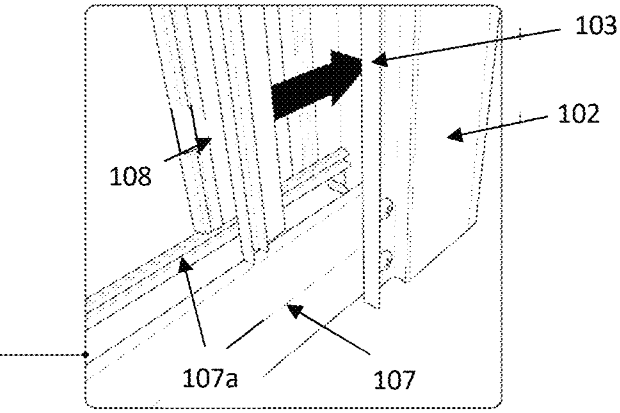
FIG. 5B illustrates a close-up of a bottom of the panel insert for the first upright of FIG. 5A.

To prepare the first upright 102 and base 107 structure for receiving individual panels 110 to form the gate panel 112, a panel insert 108 is seated into the channel 103 of the first upright. As shown in FIGS. 5A-5C, the panel insert 108 is positioned upright or vertically onto the top edge of the base 107 and, as shown by the direction of the arrow in FIG. 5B, inserted into the longitudinal channel 103 between the flanges 104 of the first upright 102 (FIG. 5A). The panel insert 108 includes a slot 109, which is configured for receiving each of the individual panels 110 (FIG. 5C). The first upright 102 and base 107 with the installation of the panel insert 108 is now ready to receive the individual panels 110 for construction of the gate panel 112.

Figures 6A, 6B, 6C:
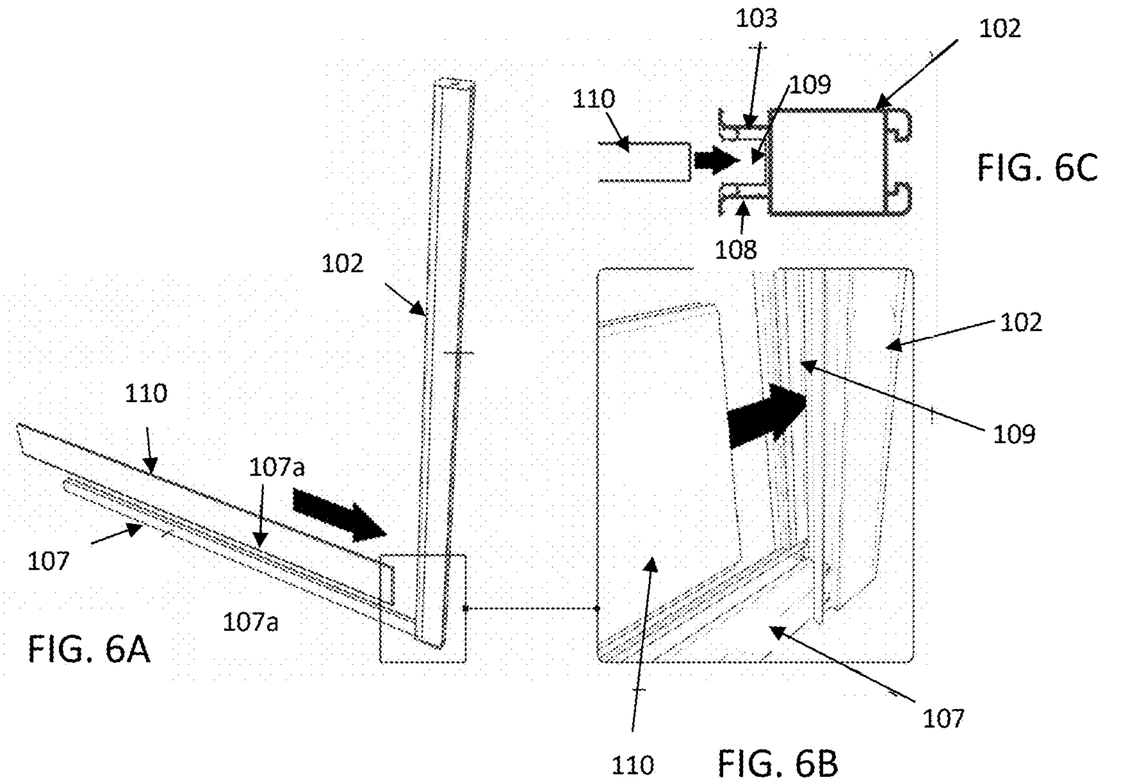
FIG. 6A illustrates insertion of an initial panel into the first upright of the modular gate assembly according to the present disclosure.
FIG. 6B illustrates a close-up of insertion of the initial panel into the first upright of FIG. 6A.
FIG. 6C illustrates a top view of insertion of the initial panel into the first upright of FIG. 6A.

FIGS. 6A-6C illustrate insertion of a first panel 110 of a series of individual panels 110 into the first upright 102. FIG. 6A shows a first panel 110 initially positioned horizontally within a groove 107*a* on the upper side of the base 107. As shown by the arrow in FIGS. 6A and 6B, the panel 110 is slid horizontally along the groove 107*a* of the base 107 until it is inserted into the slot 109 of the panel insert 108 within the channel 103 of the first upright 102. A close-up of the configuration of the panel insert 108 and its corresponding receiving slot 109 is shown in FIG. 6C.

Figure 7:
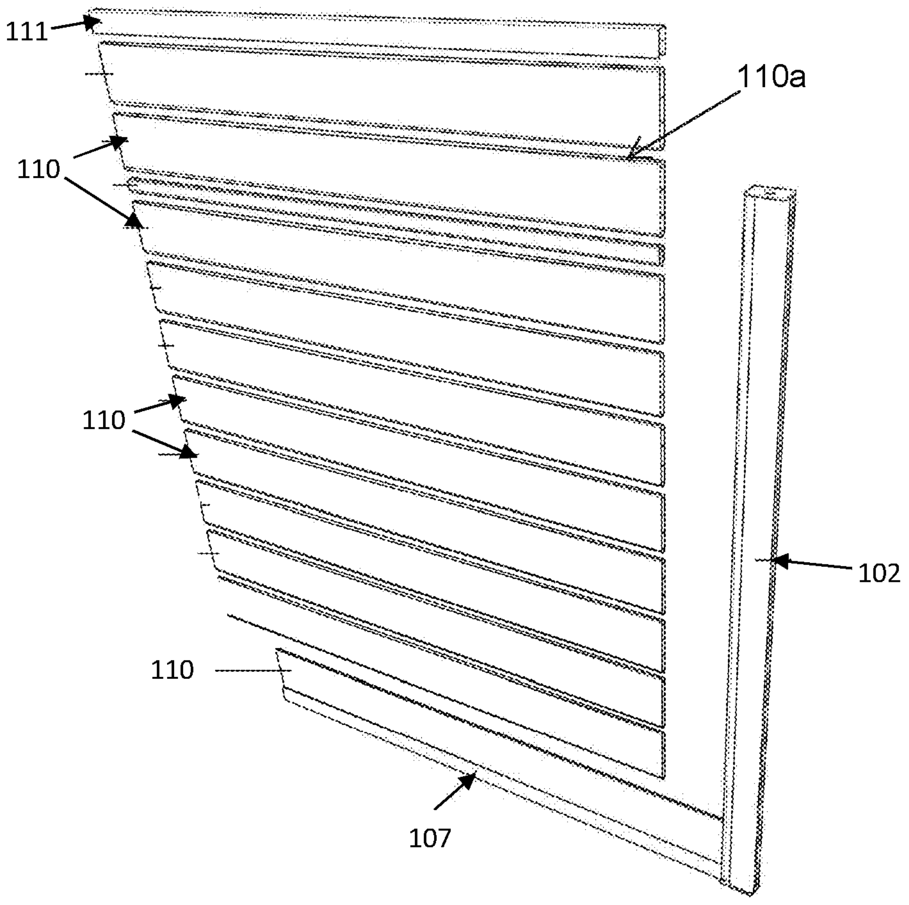
FIG. 7 illustrates sequential addition of a series of individual panels into the first upright creating a gate panel of the modular gate assembly according to the present disclosure.

After the first panel 110 is positioned onto the base 107, the panel insert 108 of the first upright 102 is ready for receiving a series of panels in a horizontal position to construct the gate panel 112 for the modular gate assembly 100, 200. FIG. 7 illustrates the assembly process, wherein individual panels 110 are added one on top of the other in a horizontal position by sliding each new panel in along a top groove 110*a* of the previous panel, wherein each panel engages the prior panel, while ends of the panels are received into the slot 109 of the panel insert 108. After the last panel 110 is installed at the appropriate height, a top edge 111 is secured over the last panel and into the top of first upright 102 using known fasteners. The series of stacked individual panels 110 form the seamless gate panel 112 used to construct the modular gate assembly as a single gate assembly 100 or a double gate assembly 200.

Figures 8A, 8B, 8C, 8D:
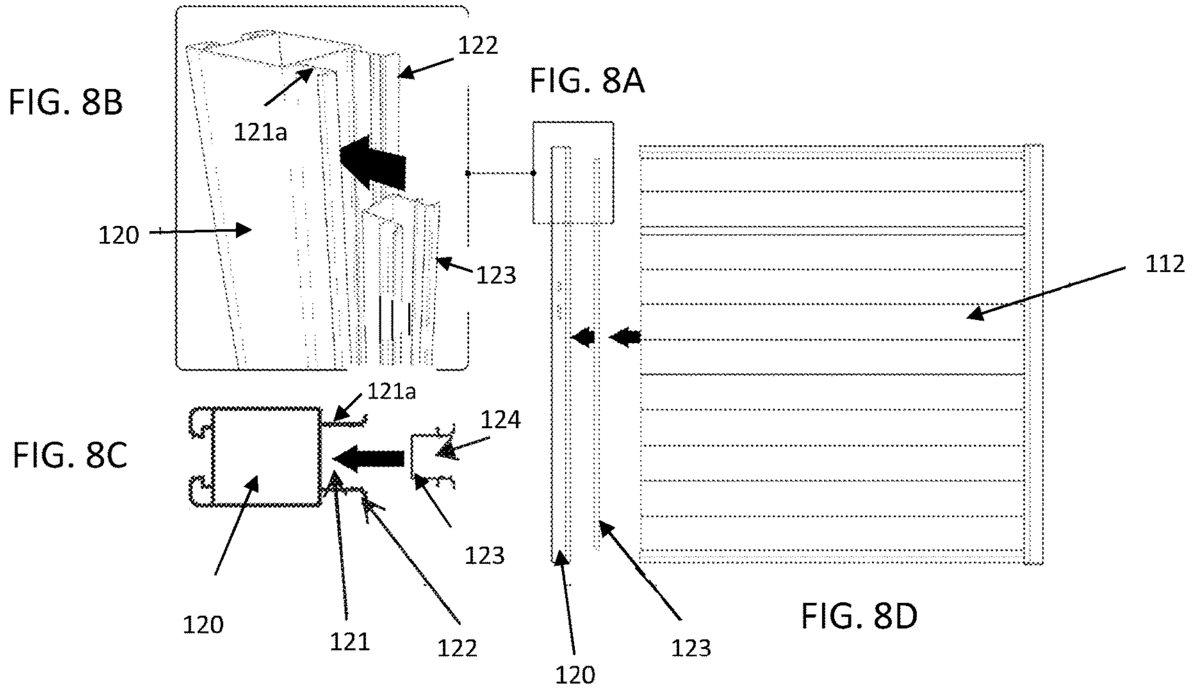
FIG. 8A illustrates a second upright of the modular gate assembly according to the present disclosure.
FIG. 8B illustrates a close-up view of a top of the second upright and insertion of a panel insert into the second upright of FIG. 8A.
FIG. 8C illustrates a top view of inserting the panel insert into the second upright of FIG. 8B.
FIG. 8D illustrates fitting a series of panels constructed as a gate panel into the second upright of FIG. 8A.

After the panels 110 are positioned within the first upright 102, the gate panel 112 is now ready for joining to the second upright 120, as illustrated in FIGS. 8A-8D. The second upright 120 is the handle/lock side of the modular gate assembly 100. The second upright 120 also includes a longitudinal channel 121 extending from a side of the upright. Similar to the channel 103 of the first upright 102, the channel 121 of the second upright 120 includes a pair of opposing flanges 122 extending from two opposing sides 121*a* extending perpendicular to a side wall of the second upright 120 (FIG. 8B).

Figures 9A, 9B, 9C:
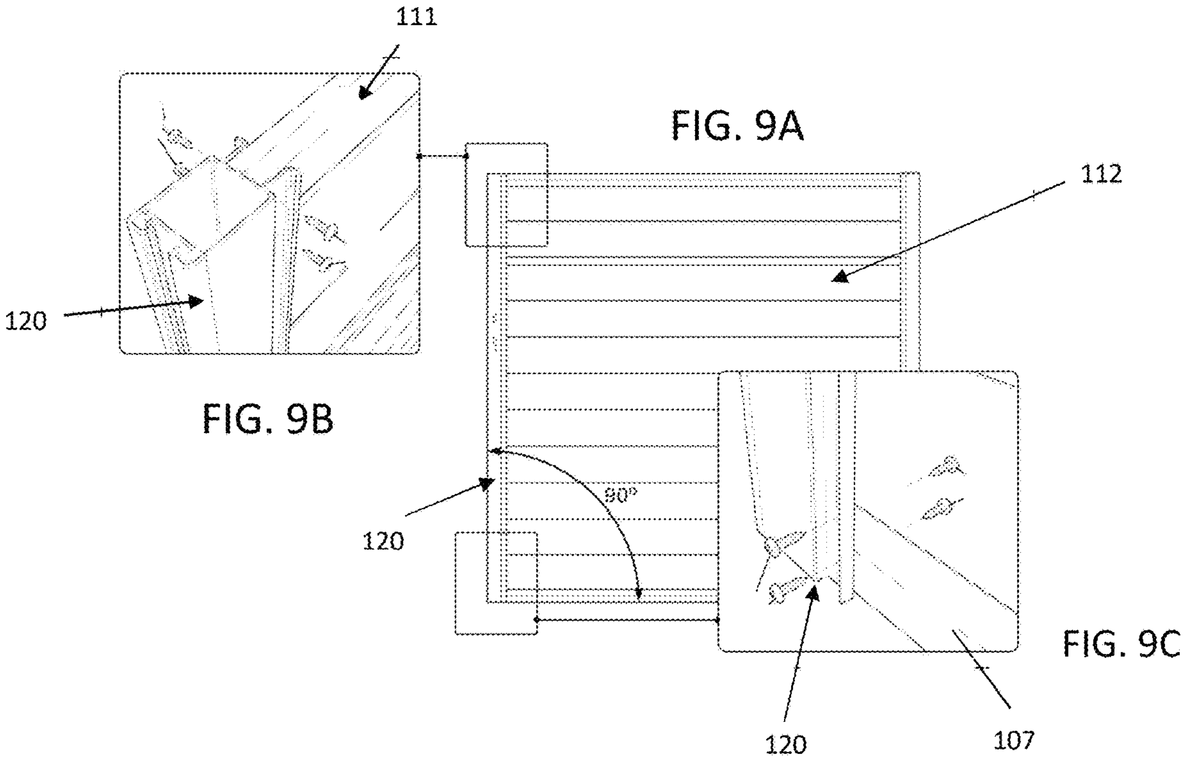
FIG. 9A illustrates securing the series of panels as a gate panel to the second upright of the modular gate assembly according to the present disclosure.
FIG. 9B illustrates a close-up of a top corner of the gate panel of FIG. 9A.
FIG. 9C illustrates a close-up of a bottom corner of the gate panel of FIG. 9A.

Prior to receiving the gate panel 112, a panel insert 123 having a slot 124 is positioned into the channel 121 of the second upright 120 (FIGS. 8A and 8C). The panel insert 123 includes a slot 124 configured for receiving the gate panel 112 formed as previously described (FIG. 8D). After the gate panel 112 is inserted into slot 124 of the panel insert 123, as shown by the arrows in FIG. 8D, the gate panel is secured into the top (FIGS. 9A and 9B) and bottom (FIGS. 9A and 9C) of the second upright 120 at a 90° angle using known fasteners.

Figure 10A:
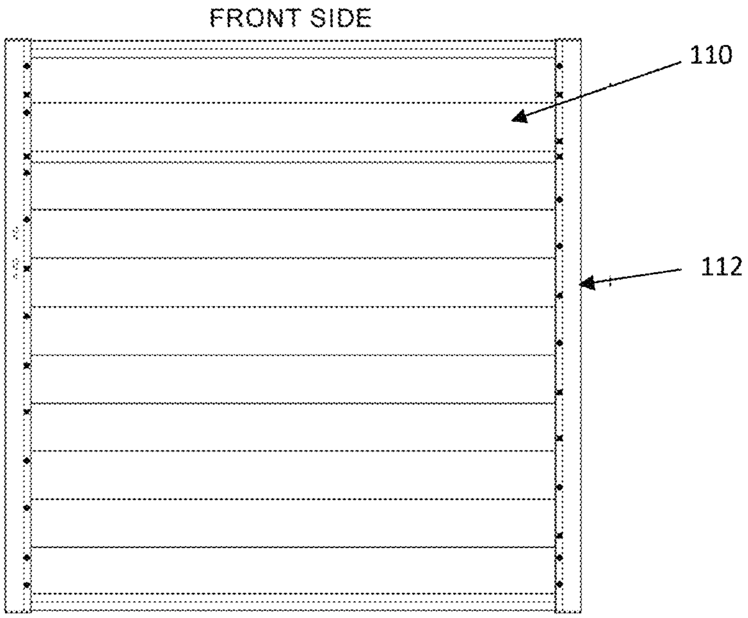
FIG. 10A illustrates a front view of the series of panels of the modular gate assembly according to the present disclosure.
Figure 10B:
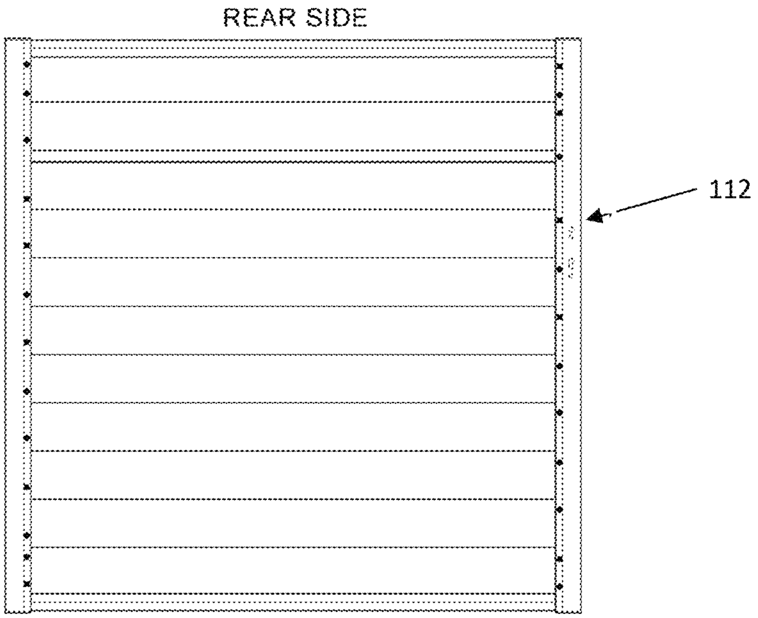
FIG. 10B illustrates a rear view of the series of panels of the modular gate assembly according to the present disclosure.

After the gate panel 112 is secured between the first upright 102 and the second upright 120, each individual panel 110 may be secured from both sides. Specifically, as shown in FIGS. 10A and 10B, known fasteners, such as self-tapping screws are used to secure each one of the panels on both the front side (FIG. 10A) and the rear side (FIG. 10B). Securing the individual panels 110 in this manner ensures that the gate panel 112 remains strong and stable during use and is more resilient to the elements.

Figures 11A, 11B, 11C:
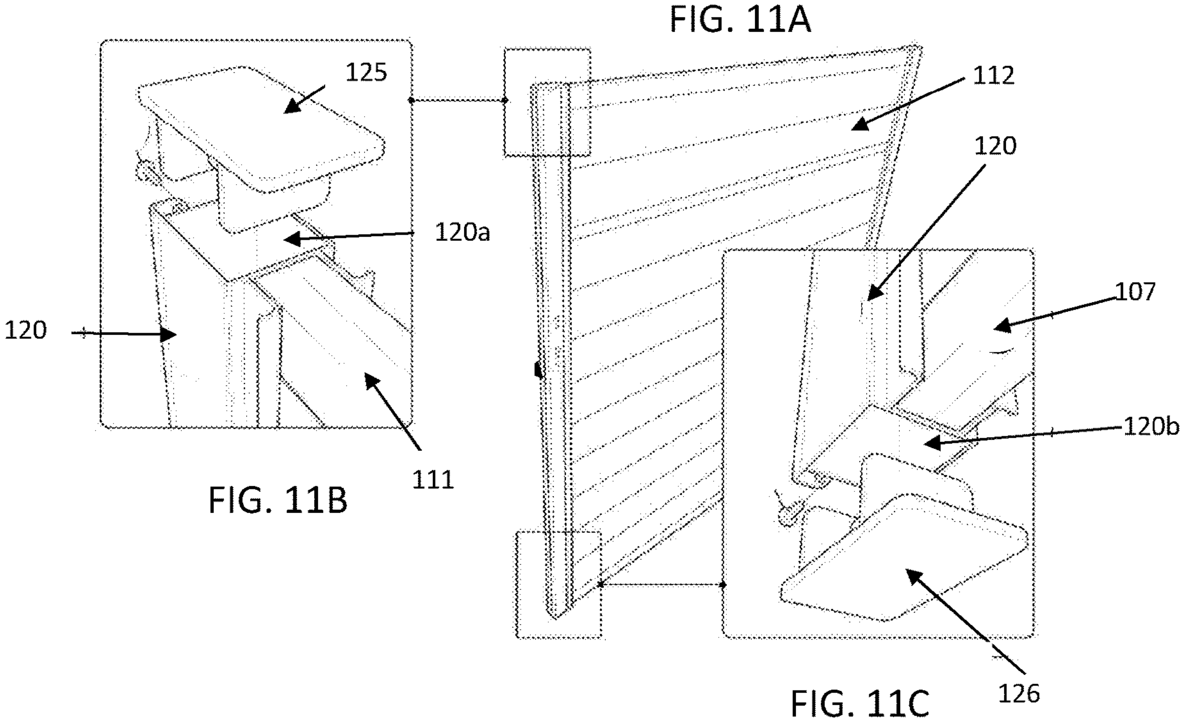
FIG. 11A illustrates a gate panel of the modular gate assembly according to the present disclosure.
FIG. 11B illustrates a close-up of a top cover on the second upright of the gate panel of FIG. 11A.
FIG. 11C illustrates a close-up of a bottom cover on the second upright of the gate panel of FIG. 11A.

As with the first upright 102, a top opening 120*a* of the second upright shown in FIG. 11A, may be closed by a top end cap 125 (FIG. 11B). As well, a bottom opening 120*b* of the second upright 120 is closed with a bottom end cap 126 (FIG. 11C). The top end cap 125 and bottom end cap 126 prevent water from entering the hollow interior 102*a* of the second upright 120, and also provide an aesthetically pleasing appearance to the first upright.

Figures 12A, 12B, 12C:
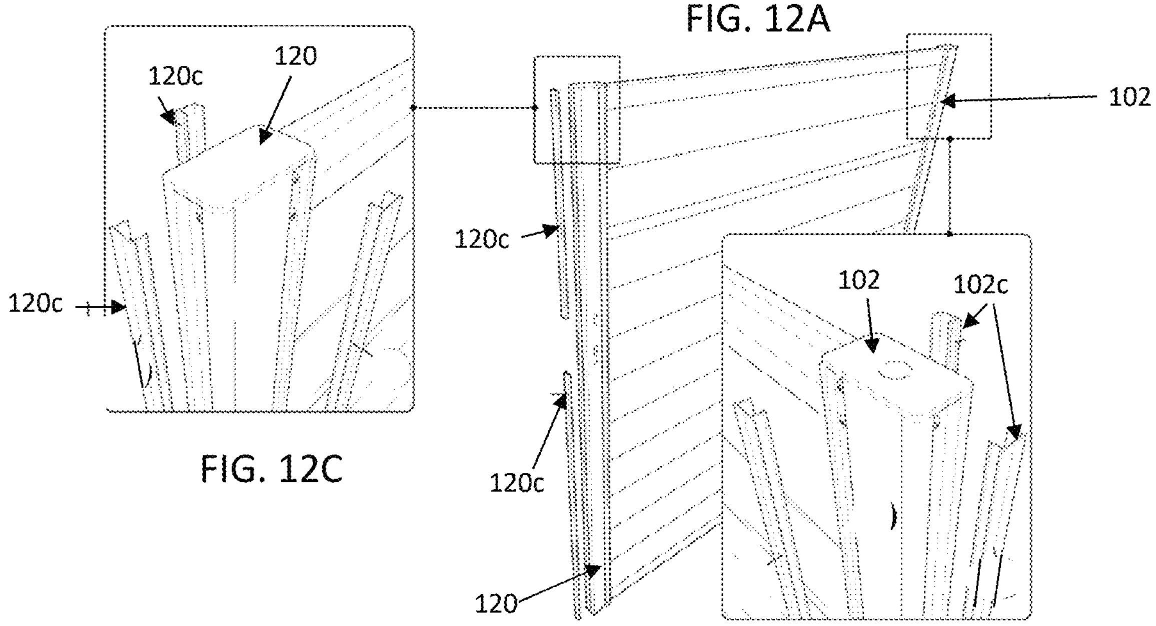
FIG. 12A illustrates a gate panel of the modular gate assembly of the present disclosure.
FIG. 12B illustrates application of channel covers to the first upright of the gate panel of FIG. 12A.
FIG. 12C illustrates application of channel to the second upright of the gate panel of FIG. 12A.

Both the first upright 102 and the second upright 120 are covered by a series of channel covers 102*c*, 120*c*. The channel covers 102*c* of the first upright 102 enclose the outer surfaces of the first upright, providing a clean, finished exterior appearance to the first upright (FIG. 12A, 12B). Similarly, a series of channel covers 120*c* also enclose the outer surfaces of the second upright 120, also providing a clean, finished exterior appearance to the second upright. While the channel covers 102*c* of the first upright 102 are essentially the same height as the first upright, the channel covers 120*c* are split in length on the second upright 120 (FIG. 12A), creating a space to accommodate attachment of the handle and lock assembly 150 to the second upright.

Figure 13A:
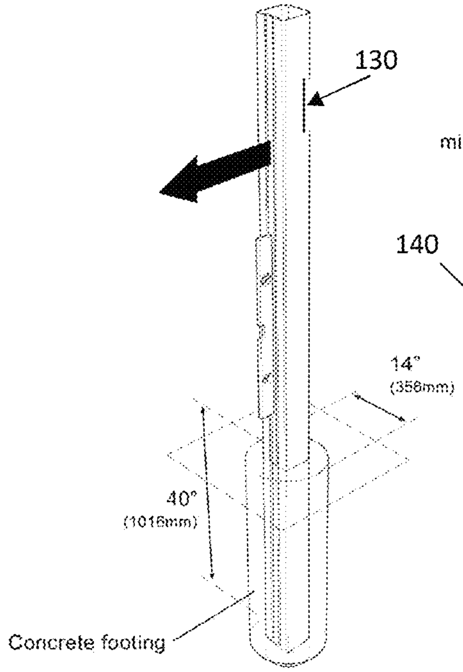
FIG. 13A illustrates a first support post for hanging the modular gate assembly according to the present disclosure.
Figure 13B:
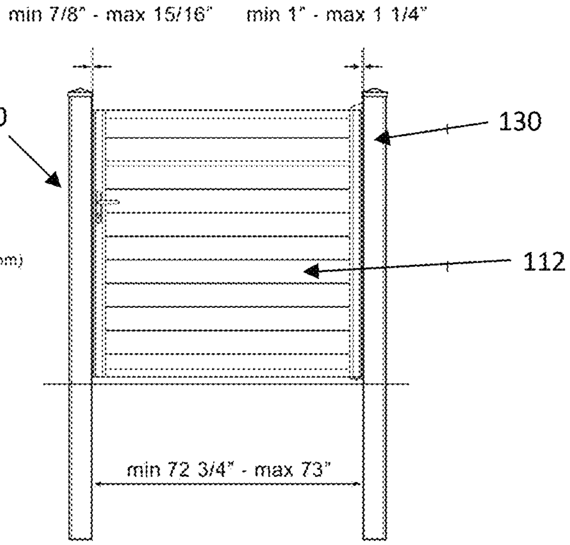
FIG. 13B illustrates the modular gate assembly installed between opposing support posts of FIG. 13A.

Installation of the modular gate assembly 100, 200, requires securing the gate assembly to support posts anchored into the ground. As known, two opposing support posts 130, 140 are set vertically into concrete footings to act as the base supports for the modular gate assemblies 100, 200. Initially, a first support post or hinge side post 130 is set vertically into a concrete footing (FIG. 13A). Spaced an appropriate distance from the first support post 130—essentially equaling the width of the gate panel 112—a second support post or lock/handle side post 140 is also set vertically into a concrete footing. Each support post 130, 140 includes grooves or channels 130*a*, 140*a* along a length of the posts. The channels 130*a*, 140*a* are configured for receiving hinge components, and/or handle/locking assembly components as will be described.

Figures 14A, 14B, 14C:
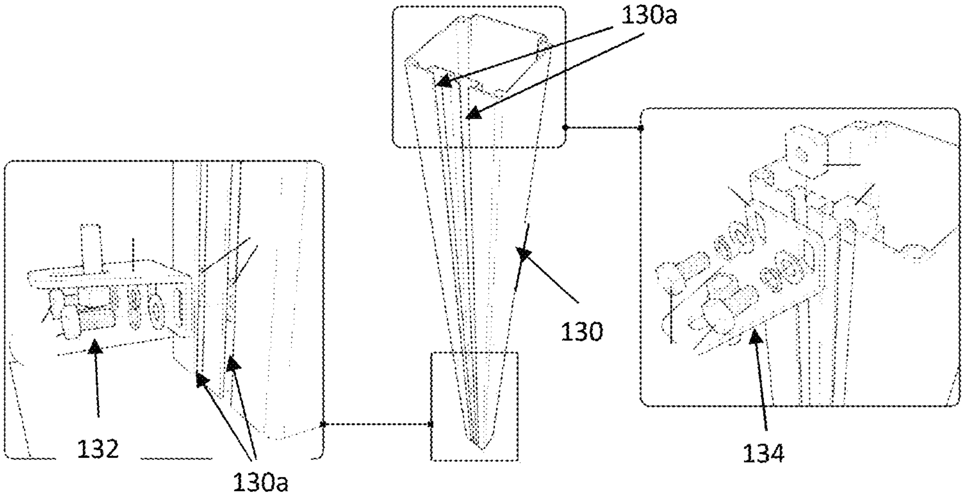
FIG. 14A illustrates a support post according to the present disclosure.
FIG. 14B illustrates bottom hinges for hanging the modular gate assembly to the support post of FIG. 14A.
FIG. 14C illustrates top hinges for hanging the modular gate assembly to the support post of FIG. 14A.

Specifically, as shown in FIGS. 14A-14C, the next step is hanging the gate panel 112 to a first support post or hinge side post 130. Using standard mounting hardware, such as bolts and washers, a lower hinge 132 is secured to the first support post 130 through the channel 130*a*. The gate panel 112 is then hung onto the lower hinge 132 and secured using known methods and fasteners (FIG. 14B). With the gate panel 112 in place, an upper hinge 134 is then fit onto the top of the first support post 130 through the channel 130*a*, and the gate panel 112 secured to upper hinge (FIG. 14C). At this stage, the gate panel 112 is secured through the lower hinge 132 and upper hinge 134 to the first support post 130.

Figure 15A:
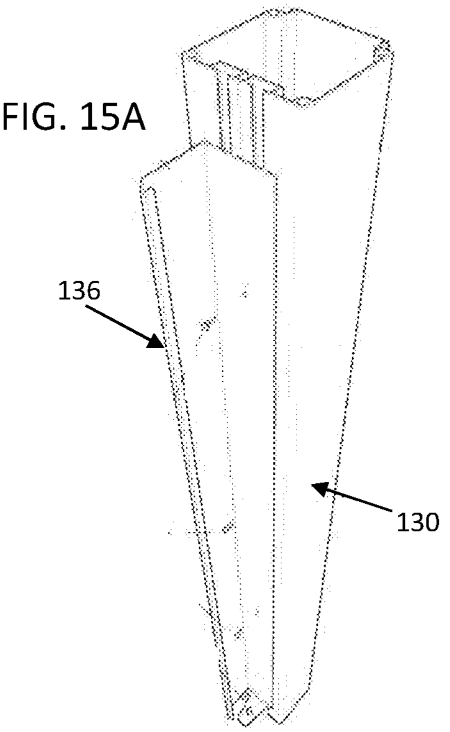
FIG. 15A illustrates addition of a gap-closer to the posts according to the present disclosure.
Figure 15B:
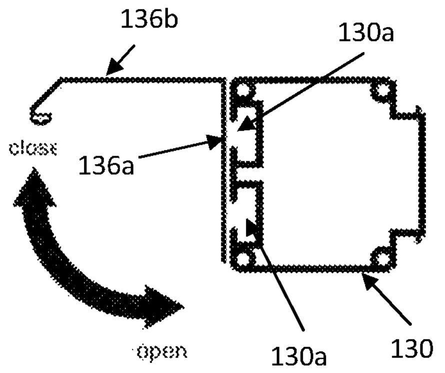
FIG. 15B illustrates a top view of the gap-closer on the post of FIG. 15A.
Figure 16A:
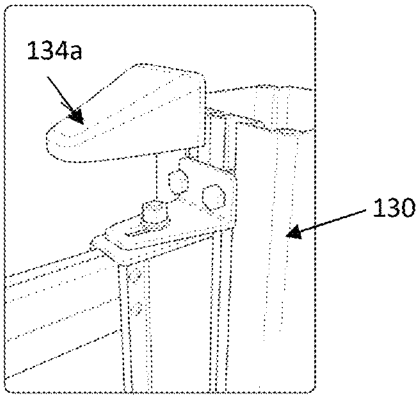
FIGS. 16A-16B illustrate addition of hinge covers and post covers to the modular gate assembly according to the present disclosure.
Figure 16B:
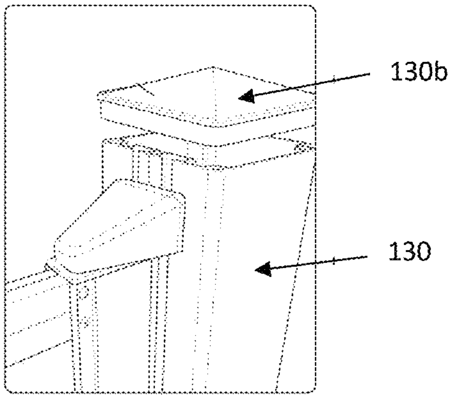

After the gate panel 112 has been mounted onto the hinges 132, 134, and the gate is adjusted and checked for level and able to swing freely, the upper hinge 134 is removed to enable mounting a gap-closer 136 to the hinge side post 130 (FIG. 15A). The gap-closer 136 has a generally L-shaped configuration formed by a first side 136*a* and a second side 136*b* (FIG. 15B). As shown in FIG. 15A, the first side 136*a* of the gap-closer 136 fits against the support post 130 between the lower hinge 132 and the upper hinge 134 and is attached to the support post 130 using fasteners, such as screws. The gap-closer 136 is configured to eliminate gaps and cover the channels 130*a* on the hinge support post 130 of the modular gate assembly 100, creating a seamless appearance while improving performance. After installation of the gap-closer 136, the gate panel 112 is positioned on the lower hinge 132 and held in place while the upper hinge 134 is remounted into position. A top hinge cover 134*a* is then secured to the top hinge 134, and a post cap 130*b* is fitted onto the top of the hinge side support post 130 (FIGS. 16A-16B). Both the top hinge cover 134*a* and the post cap 130*b* provide protection of the components from the elements, while giving a finished appearance to the modular gate assembly 100.

Figure 17:
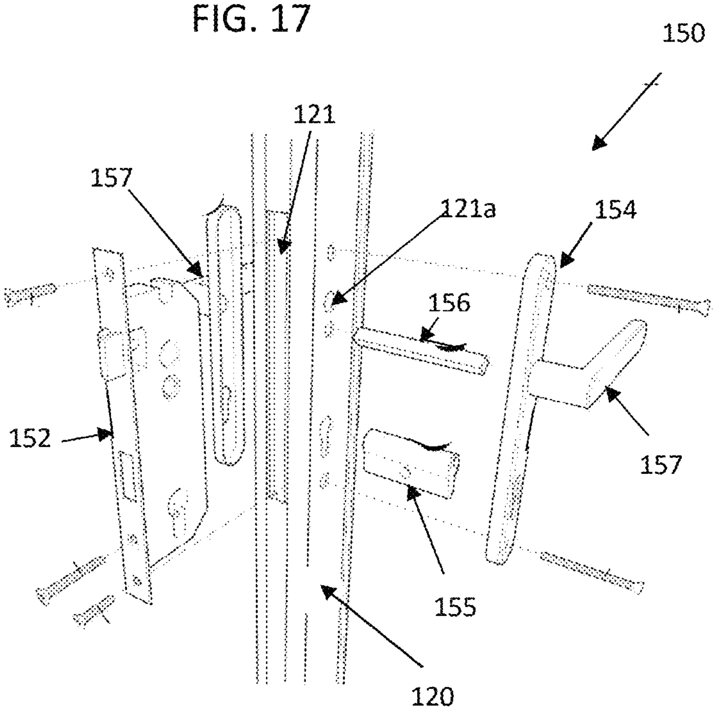
FIG. 17 illustrates an exploded view of a lock and handle assembly for use with the modular gate assembly according to the present disclosure.

After hanging the gate panel 112 onto the first post or hinge side support post 130, the gate assembly is ready for installation of a handle and lock assembly 150 onto the second upright 120 of the gate panel assembly. As shown in FIG. 17, the handle and lock assembly 150 includes a lock case 152 which is initially slide into position into channel 121 on the second upright 120 and secured into position using a plurality of screws. A handle assembly 154 is provided, which includes a lock hub 154, spindle 156 and a pair of opposing handles 157. The lock hub 155 and spindle 156 of the handle assembly 154 are slid into appropriate openings in the front of the second upright 120, where they pass into the positioned lock case 152 and secured therein using screws. Two opposing handles 157 are secured one on each side of the second upright 120 and through the lock hub 155 and spindle 156.

Figure 18A:
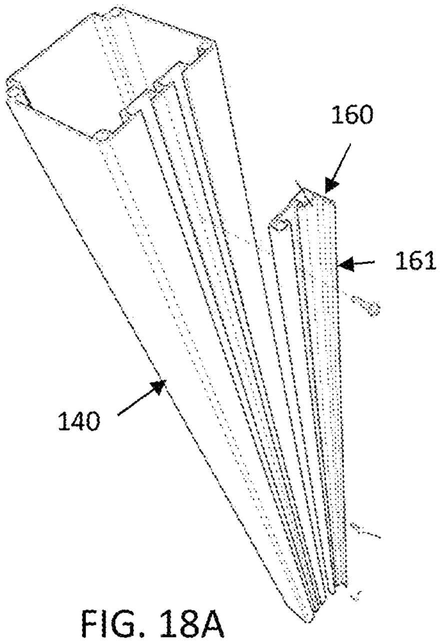
FIG. 18A illustrates addition of a gate stopper to the modular gate assembly according to the present disclosure.
Figure 18B:
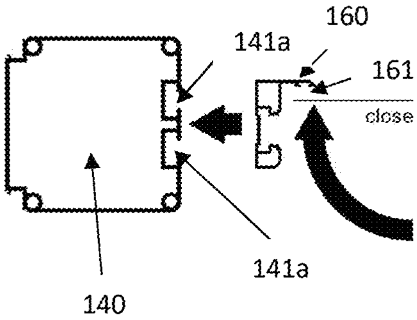
FIG. 18B illustrates a top view of the gate stopper of FIG. 18A.

As shown in FIG. 18A, a gate stopper 160 is attached to an inside side of the handle/lock side post 140 using known fasteners. The gate stopper 160 is positioned longitudinally along the inside side of the second post 140 and is designed to prevent the gate panel 112 from swinging around too far from the post. Specifically, the gate stopper 160 has an L-shape with an edge 161, which extends perpendicular to the side of the post on the swing side of the gate, thereby preventing the gate from swinging too far back from the post 140 as the gate is caught by the edge 161 (FIG. 18B).

Figure 19:
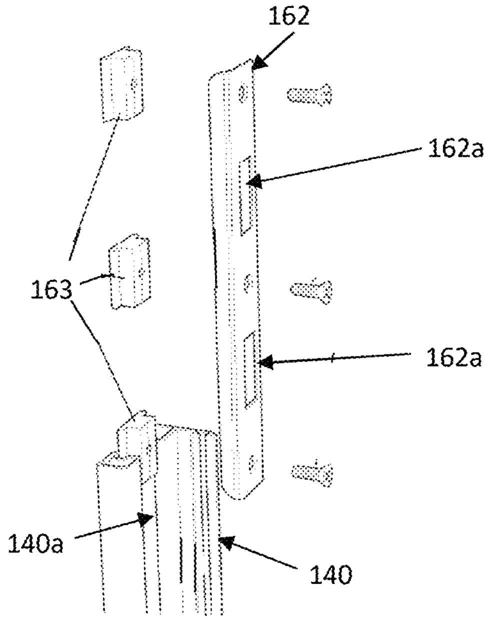
FIG. 19 illustrates an exploded view of a strike plate for engaging the lock and handle assembly of the modular gate assembly according to the present disclosure.

After the gate stopper 160 is positioned on the handle/lock side post 140, a strike plate 162 is attached to at least three stoppers 163 which are slid into vertical channels 140*a* of the post (FIG. 19). The strike plate 162 is then slid down the vertical channels 140*a* to a location along the post 140 where the handle and lock assembly 150 can engage with the holes 162*a* in the strike plate to enable locking and unlocking the gate assembly 100.

The present modular gate assembly, whether as a single modular gate assembly 100 or double modular gate assembly 200 provides an innovative solution in gate fabrication. Utilizing high-quality aluminum alloy, the embodiments of the present modular gate assembly 100, 200 offer enhanced durability and aesthetic appeal. The unique design includes adaptable sizing for various entryways, dual swing functionality, and a modular construction for easy assembly and maintenance. Addressing common issues such as sagging and material incompatibility, the present modular gate assembly 100, 200 combines structural integrity with a modern, sleek design, making it suitable for both residential and commercial applications, and represents a significant advancement in the field of gate construction.

It should be noted that various changes and modifications to the presently preferred embodiments described herein will be apparent to those skilled in the art. Such changes and modifications may be made without departing from the spirit and scope of the present disclosure and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

The invention claimed is:

1. A modular gate assembly comprising:
- a first upright formed from four side walls surrounding an open interior;
- a second upright formed from four side walls surrounding an open interior, the second upright opposing the first upright;
- a longitudinal channel extending from an outer wall of each of the first upright and second upright;
- wherein the longitudinal channel of the first upright is configured for receiving a panel insert within an interior space of the longitudinal channel, the panel insert having a length equal to a length of the longitudinal channel; and,
- wherein the panel insert of the first upright is configured for receiving a plurality of individual panels in sequence to form a gate panel.

2. The modular gate assembly of claim 1, wherein the longitudinal channel is formed by two opposing sides extending outward from and perpendicular to one of the walls.

3. The modular gate assembly of claim 2, wherein each opposing side has a flange extending outward and perpendicular from each side.

4. The modular gate assembly of claim 1, wherein the longitudinal channel of the second upright is configured for receiving the gate panel.

5. The modular gate assembly of claim 1 wherein the first upright further includes a top hinge and a bottom hinge for hanging the gate panel.

6. The modular gate assembly of claim 1, wherein the second upright further includes a lock and handle assembly.

7. The modular gate assembly of claim 1, wherein the modular gate assembly further includes a gap closer.

8. The modular gate assembly of claim 7, wherein the gap closer is configured for mounting between the first upright and a support post.

9. A method of constructing a modular gate assembly, the method comprising the steps of:

setting a first support post into position;

setting a second support post into position opposite to the first support post;

providing a first upright having a longitudinal channel for receiving individual panels as a series of panels;

inserting a panel insert into the longitudinal channel of the first upright;

securing a base into the panel insert in a perpendicular position to the first upright to form a right angle;

sequentially adding each individual panel as a series of panels onto the base in a horizontal configuration and into the panel insert to create a gate panel; and inserting the gate panel into a longitudinal channel of a second upright opposing the first upright.

10. The method of constructing the modular gate assembly of claim 9, wherein the step of sequentially adding the individual panels includes adding each individual panel one on top of each other in a horizontal position by sliding each panel along a top groove of a prior panel, wherein each panel engages the prior panel and, wherein each end of each individual panel is received into a slot of the panel insert.

11. The method of constructing the modular gate assembly of claim 9, wherein the method further comprises adding a top hinge and a bottom hinge to the first upright for securing the upright to the first support post.

12. The method of constructing the modular gate assembly of claim 11, wherein the method further comprises securing the first upright and gate panel to the first support post with the top hinge and the bottom hinge.

13. The method of constructing the modular gate assembly of claim 9, wherein the method further comprises mounting a gap closer between the first upright and the first support post.

14. The method of constructing the modular gate assembly of claim 9, wherein the method further comprises adding a lock and handle assembly to the second upright.

15. The method of constructing the modular gate assembly of claim 9, wherein the method further comprises securing the second upright and gate panel to the second support post.

* * * * *